United States Patent
Mukherjee

(10) Patent No.: US 11,636,530 B2
(45) Date of Patent: Apr. 25, 2023

(54) RECOMMENDATION ENGINE ACCOUNTING FOR PREFERENCE DRIFT

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

(*) Notice: Subject to any disclaimer, the term of this patent is extended or adjusted under 35 U.S.C. 154(b) by 50 days.

(21) Appl. No.: 17/359,966

(22) Filed: Jun. 28, 2021

(65) Prior Publication Data
US 2022/0414739 A1    Dec. 29, 2022

(51) Int. Cl.
*G06Q 30/06* (2023.01)
*G06Q 30/0601* (2023.01)
(Continued)

(52) U.S. Cl.
CPC ....... *G06Q 30/0631* (2013.01); *G06F 16/906* (2019.01); *G06F 16/9536* (2019.01)

(58) Field of Classification Search
CPC .......... G06Q 30/06–08; G06Q 30/0631; G06F 16/906; G06F 16/9536
(Continued)

(56) References Cited

U.S. PATENT DOCUMENTS

| 6,049,777 A * | 4/2000 | Sheena | G06F 16/335 |
| | | | 707/E17.058 |
| 6,801,909 B2 * | 10/2004 | Delgado | G06Q 30/02 |
| | | | 707/999.005 |

(Continued)

FOREIGN PATENT DOCUMENTS

CN    111310033 A *  6/2020  ......... G06F 16/9535

OTHER PUBLICATIONS

Haddad, Bashar Muneer; "Preview BagS tack Classification for Data Imbalance Problems with Application to Defect Detection and Labeling in Semiconductor Units", Thesis published in . ProQuest Dissertations and Theses ProQuest Dissertations Publishing. (2019); extracted from Dialog on Jan. 28, 2023 (Year: 2019).*

(Continued)

*Primary Examiner* — Yogesh C Garg
(74) *Attorney, Agent, or Firm* — Banner & Witcoff, Ltd.

(57) ABSTRACT

Aspects of the disclosure relate to content prediction. A computing platform may train a collaborative recommendation engine to output recommendation information based on historical preference information and corresponding data drift. The computing platform may receive an account access request from a user device. The computing platform may identify, at a first time and using the collaborative recommendation engine, a preference group for the user device. The computing platform may receive, at a second time later than the first time, a second account access request from the user device. The computing platform may identify, using the collaborative recommendation engine, the preference group and data drift corresponding to the preference group between the first time and the second time, which may indicate a second set of preferences at the second time. The computing platform may generate, based on the second set of preferences, recommendation information for the user device.

20 Claims, 11 Drawing Sheets

(51) Int. Cl.
*G06F 16/906* (2019.01)
*G06F 16/9536* (2019.01)

(58) Field of Classification Search
USPC ........................................................ 705/26.7
See application file for complete search history.

(56) References Cited

U.S. PATENT DOCUMENTS

| | | | | |
|---|---|---|---|---|
| 7,113,917 | B2* | 9/2006 | Jacobi | G06Q 30/0282 |
| | | | | 705/14.67 |
| 7,571,121 | B2* | 8/2009 | Bezos | G06Q 30/0254 |
| | | | | 705/26.7 |
| 7,689,457 | B2* | 3/2010 | Chan | G06Q 30/0631 |
| | | | | 705/26.7 |
| 7,756,753 | B1* | 7/2010 | McFarland | G06Q 30/02 |
| | | | | 705/26.1 |
| 8,843,484 | B2 | 9/2014 | Gu et al. | |
| 9,400,995 | B2 | 7/2016 | Gu et al. | |
| 10,621,646 | B2 | 4/2020 | Bender et al. | |
| 10,659,323 | B2 | 5/2020 | Balakrishnan et al. | |
| 10,698,965 | B2 | 6/2020 | Sharma et al. | |
| 10,699,319 | B1 | 6/2020 | Flowers et al. | |
| 10,747,833 | B2 | 8/2020 | Xiao et al. | |
| 10,812,846 | B1 | 10/2020 | Vantalon et al. | |
| 10,817,518 | B2 | 10/2020 | Polonsky et al. | |
| 10,850,178 | B2 | 12/2020 | Ripp et al. | |
| 10,853,139 | B2 | 12/2020 | Singh et al. | |
| 10,853,867 | B1 | 12/2020 | Bulusu et al. | |
| 10,867,303 | B1 | 12/2020 | Manapat et al. | |
| 10,922,725 | B2 | 2/2021 | Mustaf et al. | |
| 10,949,909 | B2 | 3/2021 | Guo et al. | |
| 10,956,523 | B2 | 3/2021 | Huang et al. | |
| 10,970,786 | B1 | 4/2021 | Matheson et al. | |
| 10,984,397 | B2 | 4/2021 | Kassaei | |
| 11,012,749 | B2 | 5/2021 | Kimble et al. | |
| 11,023,953 | B1 | 6/2021 | Furlan et al. | |
| 2008/0010258 | A1* | 1/2008 | Sureka | G06F 16/9535 |
| 2015/0026001 | A1* | 1/2015 | Gu | G06Q 30/0631 |
| | | | | 705/26.7 |
| 2015/0379411 | A1* | 12/2015 | Kapoor | G06N 7/01 |
| | | | | 706/14 |

OTHER PUBLICATIONS

F. Zafari et al. "Modelling and Analysis of Temporal Preference Drifts Using A Component-Based Factorised Latent Approach" Faculty of Science, Engineering and Technology Swinburne University of Technology, Melbourne, VIC 3122, Australia, Sep. 4, 2018, pp. 1-37.

* cited by examiner

405 — Initial Recommendation Output Interface

Based on your historical interaction information, we recommend product/content X. Would you like to enroll/view content X?

[ Yes ]  [ No ]

FIG. 4

505 — Subsequent Recommendation Output Interface

Based on your shifting preferences of other similar users, we recommend product/content Y at this time rather than product/content X. Would you like to enroll/view content Y?

[ Yes ]  [ No ]

FIG. 5

|  | T0 | T1 | T2 | T3 | T4 |
|---|---|---|---|---|---|
| Group 1 | Red (605) | Green | Blue | Purple | Purple (Group 5A) |
| Group 2 | Green | Blue | Purple | Purple (Group 5) | Green (Group 5B) |
| Group 3 | Blue | Purple | Red | Green | Blue |
| Group 4 | Purple | Red | Green | Blue | Red |

FIG. 6

RECOMMENDATION ENGINE ACCOUNTING FOR PREFERENCE DRIFT

BACKGROUND

Aspects of the disclosure relate to recommendation systems. In some cases, recommendation systems may provide suggestions to users (e.g., what to buy, read, watch, listen to, or the like). In some instances, these recommendation systems may continually provide similar recommendations to users based on the user's historical information. Although these methods may be initially sufficient, in some instances, user preferences may drift or change over time. Accordingly, the utility of such recommendation systems may deteriorate over time as user preferences change and the recommendations become increasingly less relevant.

SUMMARY

Aspects of the disclosure provide effective, efficient, scalable, and convenient technical solutions that address and overcome the technical problems associated with content prediction. In accordance with one or more embodiments of the disclosure, a computing platform comprising at least one processor, a communication interface, and memory storing computer-readable instructions may train, using historical preference information, a collaborative recommendation engine, which may configure the collaborative recommendation engine to output recommendation information based on: 1) historical user preference information of various user groups, and 2) data drift of the historical preference information for each of the various user groups. The computing platform may receive an account access request from a user device. The computing platform may identify, at a first time and using the collaborative recommendation engine, a preference group for the user device, where identifying the preference group may be based on a similarity of preferences between the preference group and a user of the user device, and where the preference group corresponds to a first set of preferences at the first time. The computing platform may receive, at a second time later than the first time, a second account access request from the user device. The computing platform may identify, using the collaborative recommendation engine, the preference group and data drift corresponding to the preference group between the first time and the second time, where the data drift indicates that the preference group corresponds to a second set of preferences at the second time. The computing platform may generate, based on the second set of preferences, recommendation information for the user device. The computing platform may send, to the user device, the recommendation information and one or more commands directing the user device to display the recommendation information, which may cause the user device to display the recommendation information.

In one or more instances, the computing platform may provide, before training the collaborative recommendation engine, using a content-based recommendation engine, and to a plurality of user devices, initial recommendation information. In one or more instances, the computing platform may receive, from each of the plurality of user devices, user preference information. The computing platform may generate, based on the user preference information, one or more preference groups, each including a subset of the plurality of user devices, where each of the one or more preference groups may be characterized by the user preference information of the corresponding subset of the plurality of user devices, and where the one or more preference groups may include the preference group.

In one or more embodiments, the computing platform may store, for each of the one or more preference groups, a correlation between the corresponding preference group and recommended content for the given preference group at an initial time, prior to the first time. In one or more embodiments, the computing platform may identify, by comparing, for each preference group, preferences at the initial time and the first time, the data drift, where the data drift indicates a shift in preferences and comprises a temporal relationship between preferences at the initial time and the first time.

In one or more instances, the computing platform may identify, using the collaborative recommendation engine, the preference group and data drift corresponding to the preference group between the first time and the second time, by predicting, based on the data drift between the initial time and the second time, the second set of preferences for the user device. In one or more instances, the data drift may indicate that one or more preference groups have merged.

In one or more embodiments, the data drift may indicate that one or more preference groups have split. In one or more embodiments, the computing platform may update, based on the data drift, the collaborative recommendation engine. In one or more embodiments, the computing platform may use data drift for a first user preference group to predict future preferences for a second preference group, different than the first preference group.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces for correcting taste and/or preference drifts in recommendation systems in accordance with one or more example embodiments; and FIG. 6 depicts an illustrative matrix for correcting taste and/or preference drifts in recommendation systems in accordance with one or more example embodiments.

DETAILED DESCRIPTION

Figure 1A:
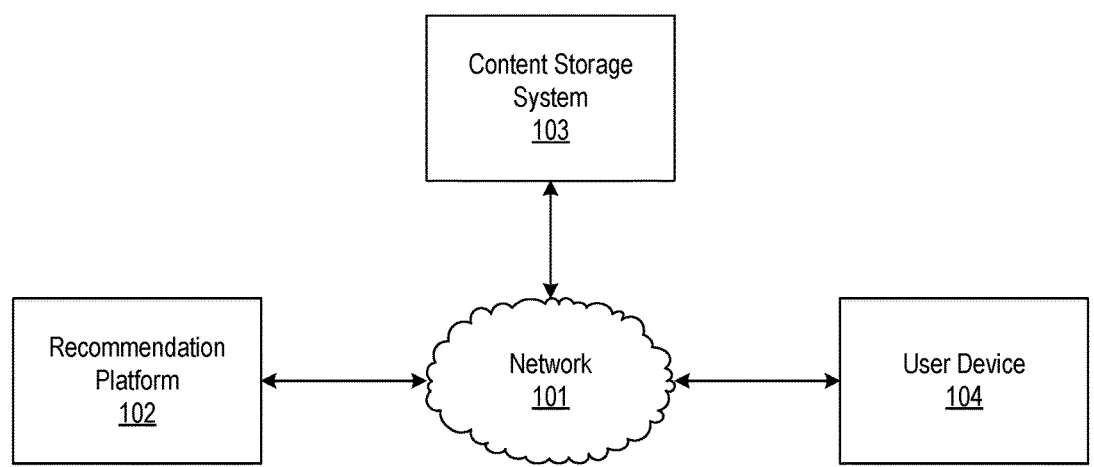
FIGS. 1A-1B depict an illustrative computing environment for correcting taste and/or preference drifts in recommendation systems in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to correcting preference drifts in recommendation systems. Recommendation systems may be software tools and/or techniques that provide suggestions for items that may be of use to a user. The suggestions provided may be aimed at supporting users in various decision making processes, such as what items to buy, what music to listen to, what news to read, and/or other decisions.

Accordingly, such systems may be essential tools for electronic commerce systems, such as online shopping sites, in order to provide recommendations for users to inform purchasing decisions. For financial institutions, recommendation systems may be used to suggest financial products such as savings, investments, mortgages, loans, and/or other products to customers.

Recommendation systems have proven to be valuable for online users so as to cope with information overload, and have become one of the most powerful and popular tools in electronic commerce.

Various techniques for recommendation generation have been proposed and deployed in commercial environments. Deployment of recommendation systems may be a multi-disciplinary effort that involves experts from various fields such as artificial intelligence, human computer interaction, information technology, data mining, statistics, adaptive user interfaces, decision support systems, marketing, consumer behavior, and/or other fields.

However, as with any artificial intelligence or machine learning based system, recommendation systems may rely on historical data for future predictions. Therefore, recommendations systems may continually recommend similar or the same items even if the need for a particular item has been fulfilled.

Furthermore, there is an economic law of diminishing returns of consumption. Once people consume something (e.g., watch a movie of a particular genre, read a book on a particular topic, or the like), their interest in consuming that thing may diminish over time.

However, recommendation systems may fail to detect the drift in pleasure or satisfaction from a certain item unless the user specifically mentions that in a feedback mechanism. Sometimes, this reduction in pleasure or satisfaction may happen at a very slow rate unknown to the user, and might not be detected by the user and/or reported (even in a sophisticated feedback mechanism).

For example, recommendation systems may continually recommend similar products to a consumer even if the consumer is no longer interested in that product. Such recommendations may be annoying and/or useless to a user who may begin ignoring them. This may create a disconnect between the merchant/service provider and the customer.

Accordingly, there is a need for a recommendation engine that corrects for preference and/or taste drifts of the user.

Two basic architectures may be used in a recommendation system. Content-based systems may be based on what people have been consuming historically based on a season, weather, holidays, vacations, and/or other factors. These systems focus on properties of items. Similarity of items may be determined by measuring the similarity in their properties.

Collaborative-filtering systems may focus on the relationship between users and items. Similarity of items may be determined by the similarity of the ratings of those items by the users who have rated both items. They may be based on what similar consumers have been using during the time. The similar consumers need not be neighbors, friends, family, or the like, but rather the similarity may refer to similarity of usage of a product or service.

In a content-based system, a profile may be constructed for each item, which may be a record or collection of records representing important characteristics of the item. In simple cases, the profile may consist of some characteristics of the item that may be easily and readily available. For example, the profile may include a set of actors in a movie (some viewers may prefer movies with their favorite actors), a director of a movie (some viewers may have a preference for the work of certain directors), a year in which a movie was made (some viewers may prefer old movies; others may watch only the latest releases), a genre or general type of a movie (some viewers may only like comedies while others may like dramas or romances), and/or other information.

Collaborative filtering may be based on the assumption that people who agreed in the past may agree in the future, and that they may like similar kinds of items as they liked in the past. The system may generate recommendations using only information about rating profiles for different users or items. By locating peer users/items with a rating history similar to the current user or item, they may generate recommendations.

An advantage of collaborative filtering is that it does not rely on machine analyzable content and therefore may be capable of accurately recommending complex items such as movies without requiring an understanding of the item itself.

Collaborative filters might not presume existence of any knowledge about the items.

Unfortunately, both of these above described methods rely heavily on historical data and cannot predict any taste or preference drift on the part of the user over time. However, collaborative filtering may be used as a guideline for predicting preference drift.

The method described herein may use a time scale as part of a prediction matrix. For example, there may be a first group (Group A) including one or more individuals that like items a, b, c, and d, and a second group (Group B) including one or more other individuals that like items e, f, g, and h, at a first time (t1). In some instances, it may be known that at time t0 (e.g., the time before t1), Group B liked a, b, c, and d. However, the taste of Group B may have drifted to different types of items. Using this information, a prediction may be made that Group B was similar to Group A at t0. Accordingly, it may be more likely that Group A may follow the taste pattern of Group B at t2.

Accordingly, the following steps may be performed. First, for each time ti (t1, t2, . . . ), collaborative groupings (G1, G2, G3, . . . ) may be created. Then, for each time ti (t1, t2, . . . ) and for each group Gj in G1, G2, G3, etc., a group Gk may be identified that was similar to Gj at time ti−1. Subsequently, it may be predicted that the population of group Gj may be similar to the population of Group Gk at time ti+1. Predictions and groups may be adjusted based on the actual feedback received from people in each group. In some instances, groups may be merged or broken apart based on actual feedback received.

This is further illustrated in matrix 605, which is shown in FIG. 6. For example, at T1 there are four collaborative clusters: Group 1, Group 2, Group 3, and Group 4. The preferences of each cluster are reflected in the color noted in the corresponding matrix cell (e.g., groups 1-4 prefer green, blue, purple, and red respectively). At T0, Group 2 used to prefer green which is what group 1 prefers at time t1. At time T1, group 2 prefers blue. Based on this trend, it may be predicted that at time T1, groups that prefer green may, at the next time T2, prefer blue. Similarly, observing how group 4 changed its preference from purple at time T0 to red at time T1, it may be predicted that Group C may prefer red at time T2 after preferring purple at time T1.

In some instances, subsequent predictions may be validated by ground data such as what the user actually chooses or prefers.

In some instances, groups may merge (as shown in the combination of Groups 1 and 2 into Group 5). For example, two groups with different preferences at T2 may have the same preferences at T3. Similarly, groups may also break up into different clusters (as shown in the split of Group 5 into Groups 5A and 5B).

In some instances, the time scale might not be uniform, and may instead mark times when preferences change significantly.

These and other features are described in further detail below.

Figure 1B:
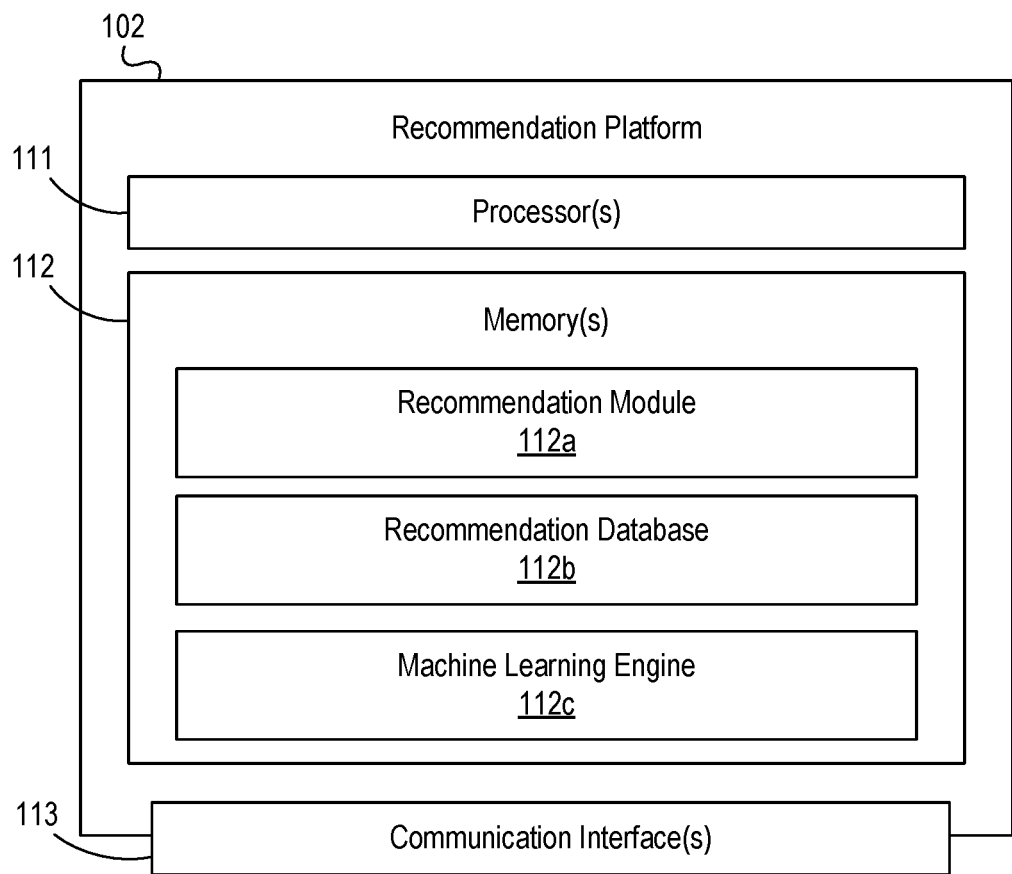

FIGS. 1A-1B depict an illustrative computing environment that implements methods for correcting taste and/or preference drifts in recommendation systems in accordance with one or more example embodiments. Referring to FIG. 1A, computing environment 100 may include one or more computer systems. For example, computing environment 100 may include a recommendation platform 102, a content storage system 103, and a user device 104.

As described further below, recommendation platform 102 may be a computer system that includes one or more computing devices (e.g., servers, server blades, or the like) and/or other computer components (e.g., processors, memories, communication interfaces) that may be used to train, host, and/or otherwise maintain a collaborative recommendation engine that may be used to provide recommendations that align with drift in user preferences.

Content storage system 103 may be or include one or more computing devices (servers, server blades, or the like) that may be configured to store content information indicating content previously recommended to, accessed by, or otherwise requested by various users. For example, the content storage system 103 may store content information related to one or more of: accounts, loans, insurance products, mortgages, investments, and/or other items that may be recommended to a user. In some instances, the content storage system 103 may be configured to communicate with the recommendation platform 102 to provide data that may be used to train the collaborative recommendation engine.

User device 104 may be a laptop computer, desktop computer, mobile device, tablet, smartphone, or the like that may be used by an individual to view or otherwise access content recommended by the recommendation platform 102. In some instances, user device 104 may be configured to display one or more user interfaces (e.g., web interfaces, mobile application interfaces, and/or other interfaces that may include recommendations for a user).

Computing environment 100 also may include one or more networks, which may interconnect recommendation platform 102, content storage system 103, and/or user device 104. For example, computing environment 100 may include a network 101 (which may interconnect, e.g., recommendation platform 102, content storage system 103, and/or user device 104).

In one or more arrangements, recommendation platform 102, content storage system 103, and/or user device 104 may be any type of computing device capable of sending and/or receiving requests and processing the requests accordingly. For example, recommendation platform 102, content storage system 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of recommendation platform 102, content storage system 103, and/or user device 104 may, in some instances, be special-purpose computing devices configured to perform specific functions.

Referring to FIG. 1B, recommendation platform 102 may include one or more processors 111, memory 112, and communication interface 113. A data bus may interconnect processor 111, memory 112, and communication interface 113. Communication interface 113 may be a network interface configured to support communication between recommendation platform 102 and one or more networks (e.g., network 101, or the like). Memory 112 may include one or more program modules having instructions that when executed by processor 111 cause recommendation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of recommendation platform 102 and/or by different computing devices that may form and/or otherwise make up recommendation platform 102. For example, memory 112 may have, host, store, and/or include recommendation module 112a, recommendation database 112b, and/or machine learning engine 112c.

Recommendation module 112a may have instructions that direct and/or cause recommendation platform 102 to execute data drift correction methods and provide recommendations, as discussed in greater detail below. Recommendation database 112b may store information used by recommendation module 112a and/or recommendation platform 102 in application of advanced techniques to adjust for data drift, provide recommendations, and/or in performing other functions. Machine learning engine 112c may be used by recommendation platform 102 and/or recommendation module 112a to refine and/or otherwise update methods for data drift correction, recommendation generation, and/or other methods described herein.

Figure 2A:
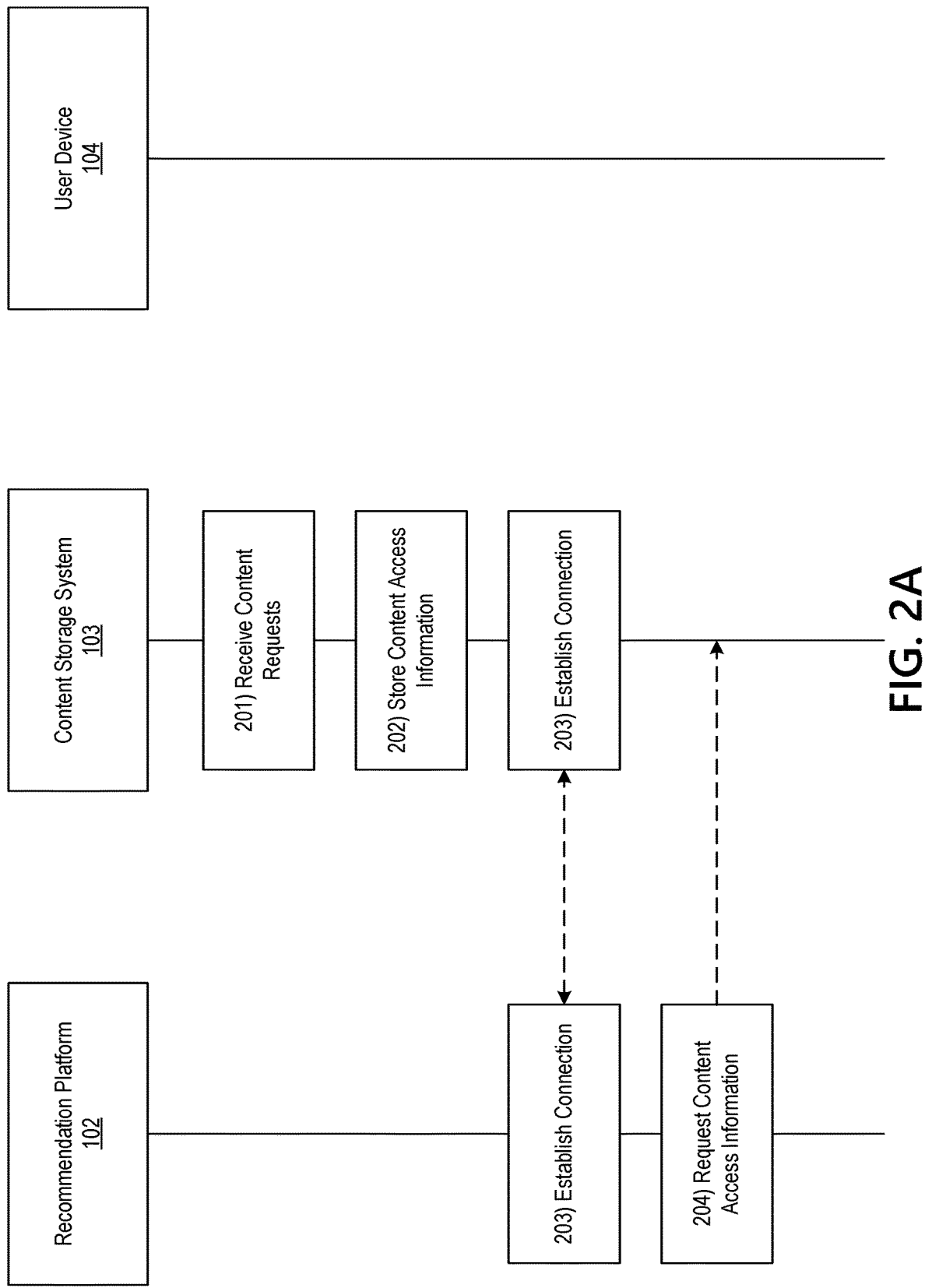
FIGS. 2A-2F depict an illustrative event sequence for correcting taste and/or preference drifts in recommendation systems in accordance with one or more example embodiments.

FIGS. 2A-2F depict an illustrative event sequence for correcting taste and/or preference drifts in recommendation systems in accordance with one or more example embodiments. Referring to FIG. 2A, at step 201, the content storage system 103 may receive requests for content from a plurality of users (which may e.g., include requests(s) for particular content such as particular music, movies, television shows, financial products (e.g., loan products, credit cards, financial incentives, investment products, or the like), and/or other content).

At step 202, the content storage system 103 may store content access information indicating what content was accessed by which user devices and/or user accounts. For example, the content storage system 103 may store content access information that may be used to initially group users based on content preferences.

At step 203, the recommendation platform 102 may establish a first connection with the content storage system 103. For example, the recommendation platform 102 may establish a first wireless data connection with the content storage system 103 to link the recommendation platform 102 to the content storage system 103 (e.g., in preparation for requesting content access information). In some instances, the recommendation platform 102 may identify whether or not a connection is already established with the content storage system 103. If a connection is already established with the content storage system 103, the recommendation platform 102 might not re-establish the connection. If a connection is not yet established with the content storage system 103, the recommendation platform 102 may establish the first wireless data connection as described herein.

At step 204, the recommendation platform 102 may send a request to the content storage system 103 for the content access information. For example, the recommendation platform 102 may send the request via the communication interface 113 and while the first wireless data connection is established.

Figure 2B:
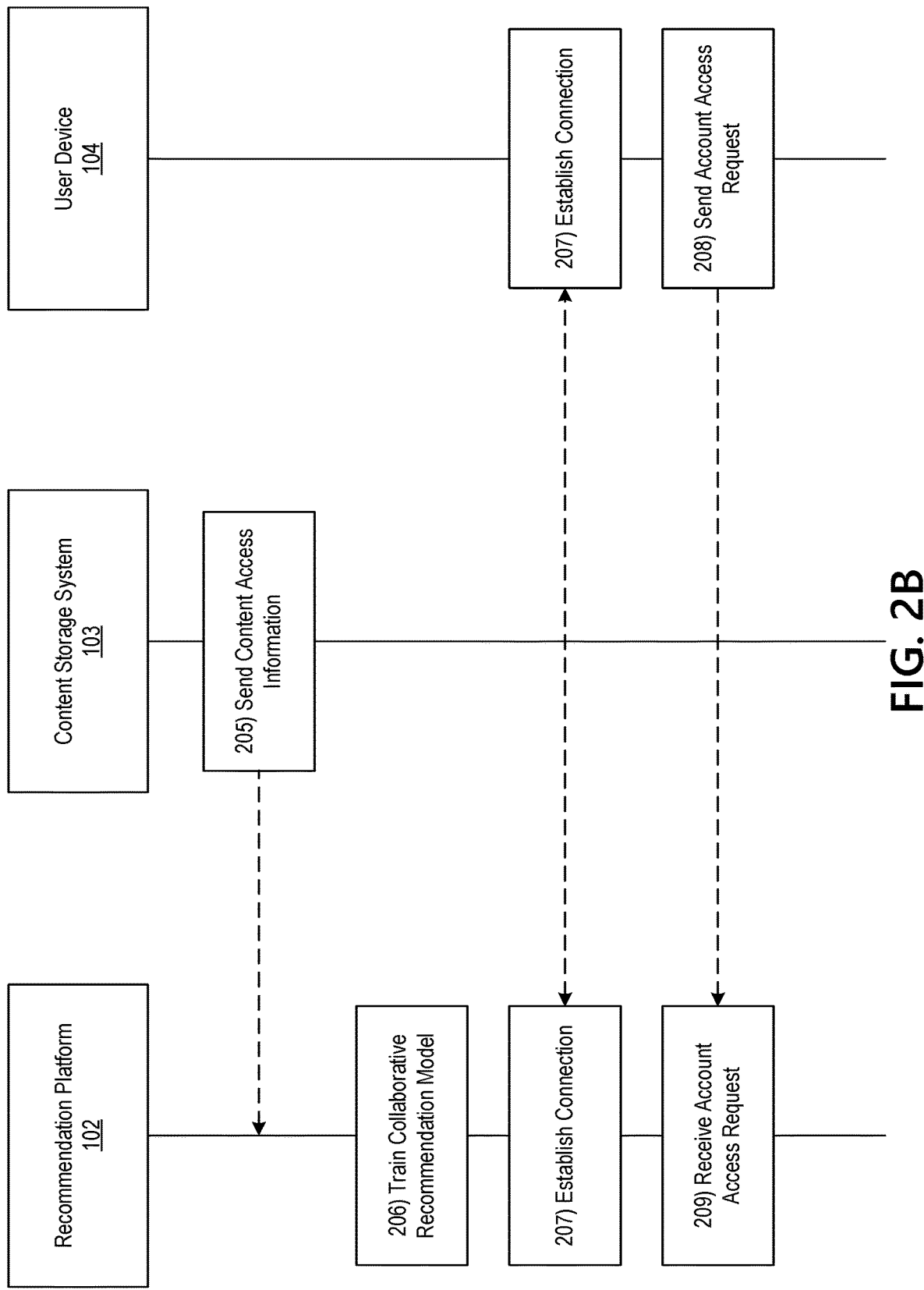

Referring to FIG. 2B, at step 205, the content storage system 103 may send content access information to the recommendation platform 102. For example, the content storage system 103 may send content access information to the recommendation platform 102 while the first wireless data connection is established.

At step 206, recommendation platform 102 may train a collaborative recommendation model/engine using the content access information. For example, the recommendation platform 102 may train the collaborative recommendation model/engine using the techniques illustrated by FIG. 6. For example, the recommendation platform 102 may first establish groups of users that request and/or otherwise access similar content (e.g., the same genre of music or video content, the same financial products, the same investment strategies, and/or based on other content characteristics). In some instances, the recommendation platform 102 may store a correlation table indicating users, user devices, accounts, or the like and their corresponding identifier group. In some instances, these preference groups might not be of uniform size (e.g., one or more groups may have differing numbers of individuals). In some instances, these groups may initially be created using a content-based recommendation engine, which may provide initial recommendations to users and thus may solicit and collect initial training data (e.g., user preference information) that may be used to establish the groups. In some instances, the recommendation platform 102 may train the collaborative recommendation model and store the correlations between preferences and groups at an initial time, prior to providing recommendation output information (e.g., as described at steps 212 and 222). In some instances, user preferences for each group may be different at this initial time than at later times (e.g., a first time corresponding to the recommendation output sent at step 212, a second time corresponding to the second recommendation output sent at step 222, or the like).

The recommendation platform 102 may then track drifts in preferences over a time period (e.g., a period between T0 and T1). For example, a first group may drift from a first set of preferences to a second set of preferences, and a second group may drift from the second set of preferences to a third set of preferences. Based on the initial preferences and updated preferences for each group, the recommendation platform 102 may train a model to predict future preferences. For example, based on identifying that the second group drifted from the second set of preferences (at T0) to the third set of preferences (at T1), the recommendation platform 102 may identify that groups currently defined by the second set of preferences may shift to the third set of preferences at a subsequent time horizon (e.g., it may predict that the first group may drift from the second set of preferences (at T1) to the third set of preferences (at T2)).

FIG. 6 further illustrates this point, by establishing a preference drift from "Red" to "Green" (e.g., using information from Group 1 between T0 and T2), from "Green" to "Blue" (e.g., using information from Group 2 between T0 and T2), from "Blue" to "Purple" (e.g., using information from Group 3 between T0 and T2), and from "Purple" to "Red" (e.g., using information from Group 4 between T0 and T2). Such preference drift may be used to predict preferences for subsequent time horizons (e.g., T2-T4).

By training a collaborative model as described above, less user input may be needed to develop and train the model in comparison to a traditional content-based method in which content similarities are identified between users and content is recommended accordingly. Furthermore, the proposed collaborative model may consume less processing power than content-based methods.

At step 207, the user device 104 may establish a connection with the recommendation platform 102. For example, the user device 104 may establish a second wireless data connection with the recommendation platform 102 to link the user device to the recommendation platform 102 (e.g., in preparation for sending an account access request). In some instances, the user device 104 may identify whether or not a connection is already established with the recommendation platform 102. If a connection is already established with the recommendation platform 102, the user device 104 might not re-establish the connection. If a connection is not yet established with the recommendation platform 102, the user device 104 may establish the second wireless data connection as described herein.

At step 208, the user device 104 may send an account access request (e.g., a request to access a streaming service, financial portal, and/or other service) to the recommendation platform 102. For example, the user device 104 may send the account access request to the recommendation platform 102 while the second wireless data connection is established.

At step 209, the recommendation platform 102 may receive the account access request. For example, the recommendation platform 102 may receive the account access request via the communication interface 113 and while the second wireless data connection is established.

Figure 2C:
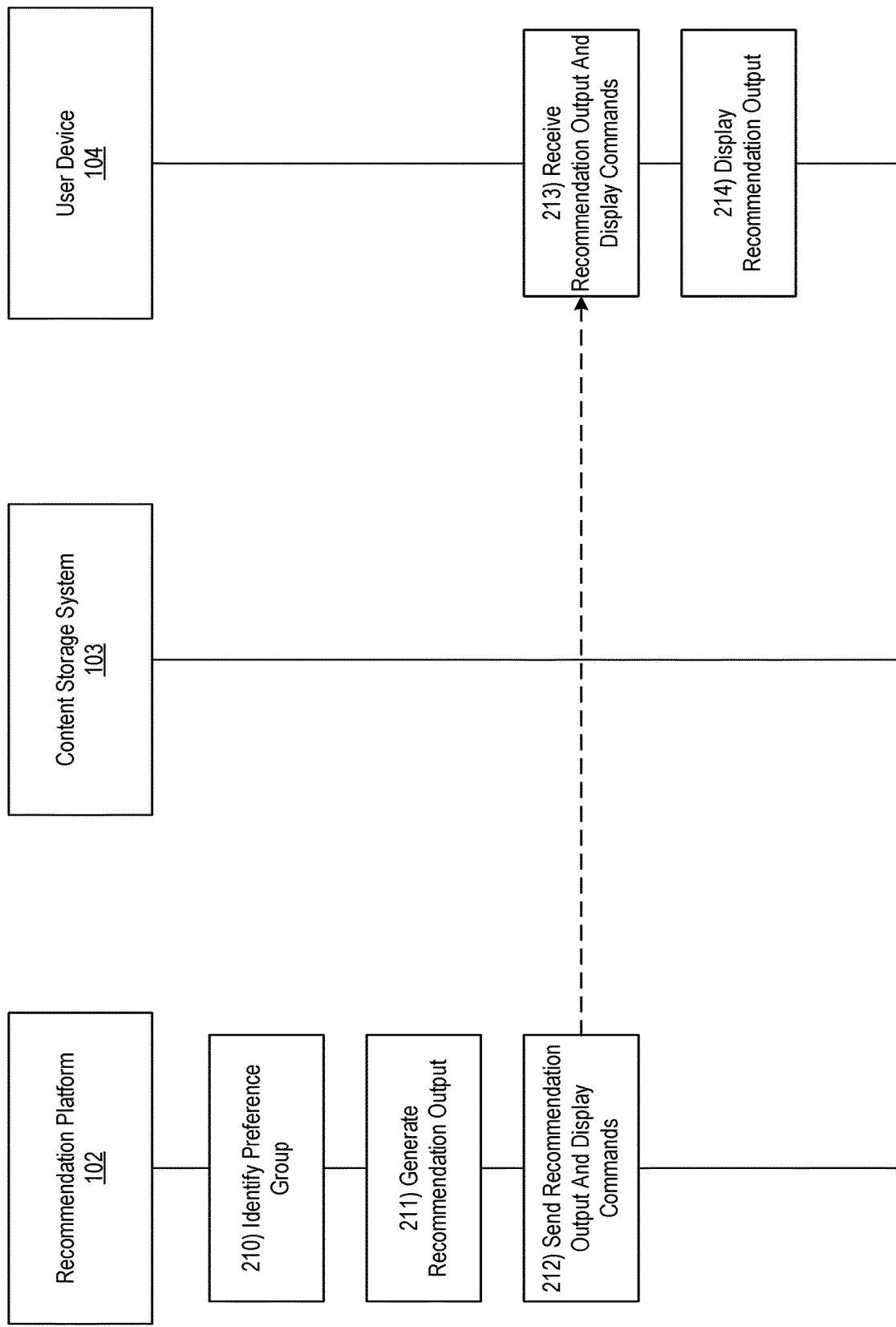

Referring to FIG. 2C, at step 210, the recommendation platform 102 may identify a preference group corresponding to the user device, an account corresponding to the user device 104, and/or a user of the user device 104. For example, the recommendation platform 102 may identify, based on the stored correlation table generated at step 206, a preference group for the user device 104.

In some instances, a preference group might not previously have been identified for the user device 104. In these instances, the recommendation platform 102 may use the collaborative recommendation model to identify similarities between historical content access information associated with the user device 104 and historical content access information associated with the various preference groups (e.g., based on shared interest in a genre, type of product, type of content, and/or other characteristic defining various items). For example, the recommendation platform 102 may establish similarity scores indicating a similarity between preferences of the user device 104 and each of the preference groups, rank the preference groups based on their similarity scores, and select the preference group with the highest similarity score.

At step 211, the recommendation platform 102 may generate a recommendation output (e.g., recommendation information) using the collaborative recommendation model. For example, the recommendation platform 102 may feed an identifier of the identified preference group into the collaborative recommendation model and output recommended content (e.g., that is currently associated with the identified preference group) accordingly. This recommended content may correspond to or be a recommendation output.

At step 212, the recommendation platform 102 may send the recommendation output to the user device 104. For example, the recommendation platform 102 may send the recommendation output to the user device 104 via the communication interface 113 and while the second wireless data connection is established. In some instances, the recommendation platform 102 may also send one or more commands directing the user device 104 to display the recommendation output.

As an illustrative example of the methods described in steps 208-212, in reference to FIG. 6, an account access request may be received from a user device between T0 and T1. The recommendation platform 102 may associate the user device with one of groups 1-4 based on similarity of the users' preferences with the preferences of each group. In doing so, for illustrative purposes, we may assume that the highest similar score was established with group 2. Accordingly, the recommendation platform 102 may identify a content preference corresponding to group 2, which in this case, is "Green." As a result, content corresponding to "Green" may be provided to the user device.

At step 213, the user device 104 may receive the recommendation output sent at step 212. For example, the user device 104 may receive the recommendation output while the second wireless data connection is established. In some instances, the user device 104 may also receive the one or more commands directing the user device 104 to display the recommendation output.

At step 214, based on or in response to the one or more commands directing the user device 104 to display the recommendation output, the user device 104 may display the recommendation output. For example, the user device 104 may display a graphical user interface similar to graphical user interface 405, which is shown in FIG. 4, and which may include a content/product recommendation and/or an option to enroll in or otherwise view the content.

Figure 2D:
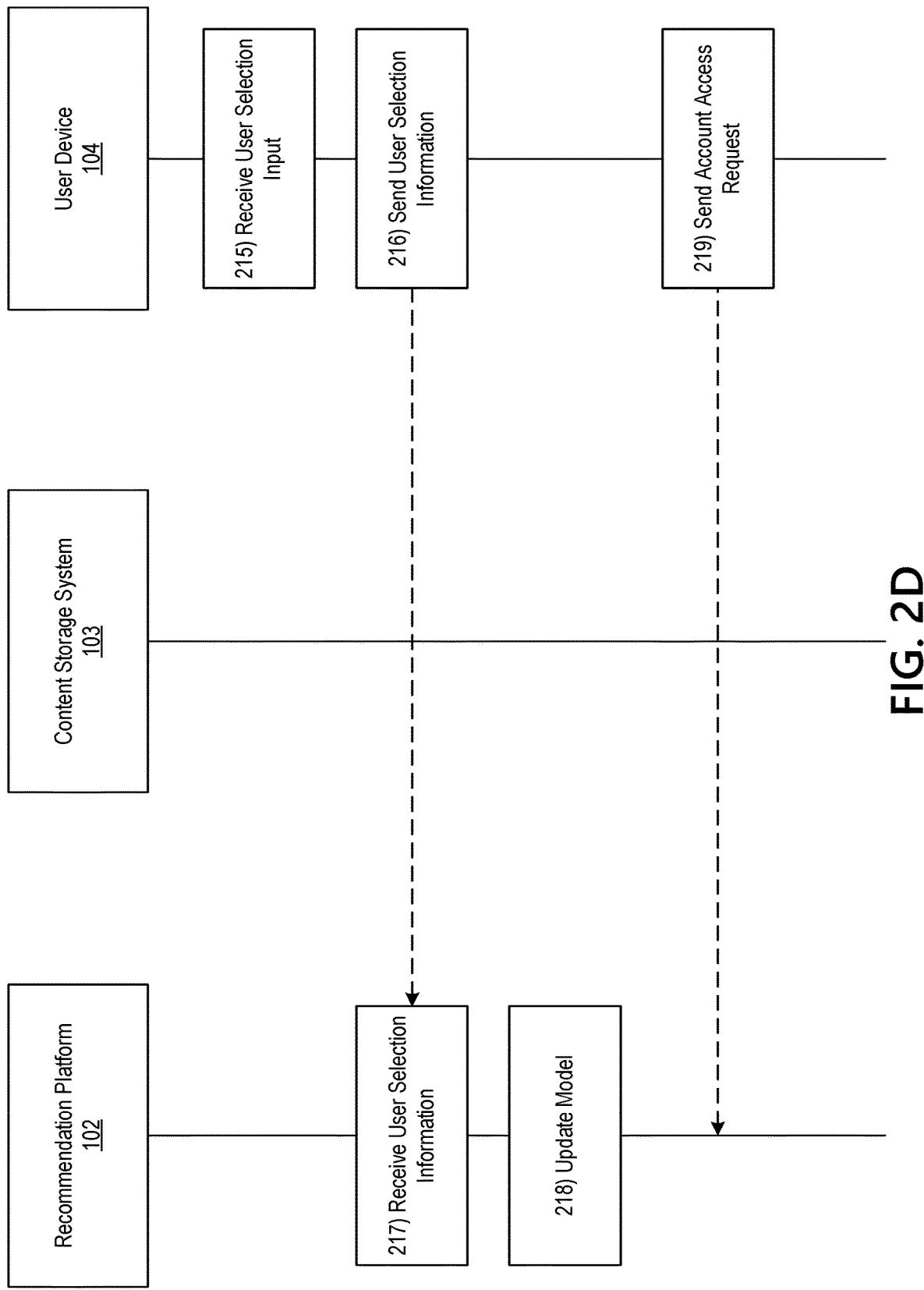

Referring to FIG. 2D, at step 215, the user device 104 may receive a user selection input. For example, the user device 104 may receive a user input indicating whether or not to enroll the user in and/or otherwise display the recommended content.

At step 216, the user device 104 may send user selection information, based on the user selection input, to the recommendation platform 102. For example, the user device 104 may send the user selection information to the recommendation platform 102 while the second wireless data connection is established.

At step 217, the recommendation platform 102 may receive the user selection information sent at step 216. For example, the recommendation platform 102 may receive the user selection information via the communication interface 113 and while the second wireless data connection is established.

At step 218, the recommendation platform 102 may update the collaborative recommendation model based on the user selection information. For example, if the recommendation platform 102 received user selection information indicating that the user enrolled in or otherwise selected the recommended content, the recommendation platform 102 may reinforce the existing policies/structure/rules of the collaborative recommendation model. In contrast, if the recommendation platform 102 received user selection information indicating that the user did not enroll in or otherwise select the recommended content, the recommendation platform 102 may update/refine the collaborative recommendation model to account for this failure to correctly predict preferences/taste of the user. In some instances, rather than immediately adjusting the collaborative recommendation model based on such user selection information from a single user, the recommendation platform 102 may wait to see if a number of other users in the corresponding preference group have the same reaction to the recommended content (e.g., wait until a predetermined number of individuals or a predetermined percentage of individuals in the group reject the recommendation), and then update the collaborative recommendation model once that number/threshold is satisfied. In doing so, the recommendation platform 102 may ensure that the collaborative recommendation model remains robust against outlier preferences. In some instances, where the predetermined number/threshold of additional rejecting users in the group is not satisfied after a given period of time (e.g., a day, a week, a month, or the like), the user may be identified as an outlier, and may, in some instances, be moved to a different preference group that may better align with the user's preferences. Accordingly, users may be dynamically moved between preference groups so as to refine the collaborative recommendation model to provide the most accurate predictions for each user.

At step 219, the user device 104 may send a second account access request to the recommendation platform 102. For example, the user device 104 may send the second account access request to the recommendation platform 102 while the second wireless data connection is established. In some instances, the user device 104 may have sent the account access request (at step 208) at a first time, and may send the second account access request at a second time, later than the first time.

Figure 2E:
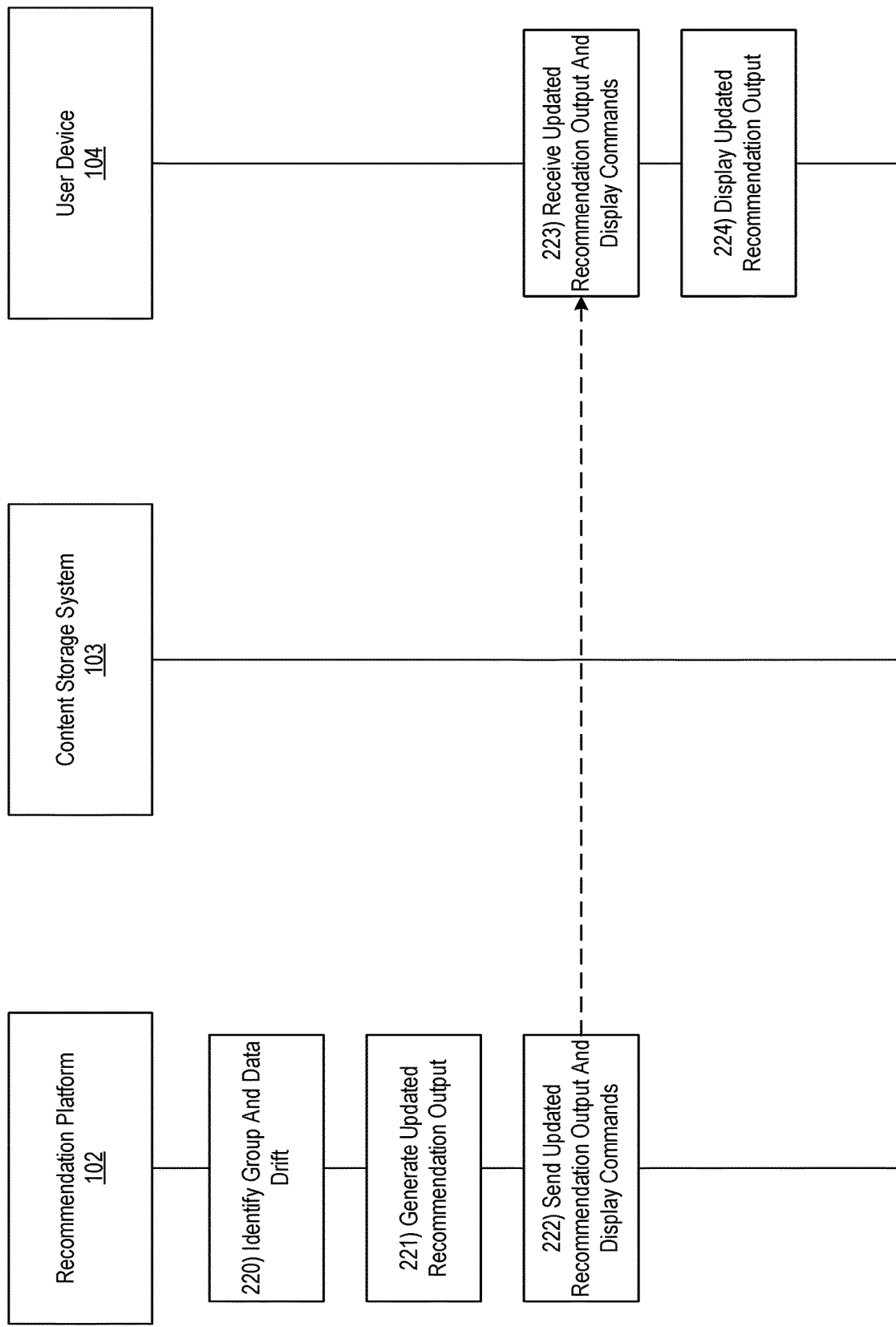

Referring to FIG. 2E, at step 220, the recommendation platform 102 may use the collaborative recommendation model to identify a preference group for the user device 104 and/or corresponding data drift for the identified preference group. For example, as shown in FIG. 6, preferences of a group may change over time (e.g., group 2 changes preferences from "green" to "blue" to "purple", etc."). Accordingly, the recommendation platform 102 may be configured to predict, using the collaborative recommendation model and based on historical preference information stored in the model, updated content recommendations that account for drift in preferences. To do so, the recommendation platform 102 may identify current preferences for the identified group as well as another group that previously was associated with these same preferences. For example, in reference to FIG. 6, between T1 and T2, Group 2 may prefer "Blue." Between T0 and T1, Group 3 preferred "Blue." The recommendation platform 102 may then use the collaborative recommendation model to identify content preferences of this other identified group during an immediately subsequent time period (e.g., between T1 and T2). For example, the recommendation platform 102 may identify that preferences of Group 3 drifted from "Blue" to "Purple." Using this information, the recommendation platform 102 may predict that Group 2, which currently prefers "Blue," may subsequently prefer "Purple" between T2 and T3 (e.g., by following the same preference drift pattern of Group 3).

In some instances, in identifying the data drift, the recommendation platform 102 may identify that one or more groups have merged. For example, at a particular time interval, the preferences of two groups, which previously had different preferences, may align. This is illustrated, for example, in FIG. 6, where Groups 1 and 2 merge into Group 5 between T3 and T4, when the preferences of both groups is "Purple." Similarly, in some instances, the recommendation platform 102 may identify that one or more groups have split. For example, at a particular time interval, a particular group that shared common preferences may split into one or more groups that each of different preferences. This is illustrated, for example, by the split of Group 5 into Groups 5A and 5B at T4, when the preferences of a first subset of Group 5 remains at "Purple" and the preferences of a second subset of Group 5 drift to "Green."

In some instances, a group's preferences might not change from one interval to the next. This is illustrated, for example, in FIG. 6 as Group 2 continues to prefer "Purple" between T3 and T4 after preferring "Purple" during the immediately preceding time interval. Sometimes, in these instances, the collaborative recommendation model may identify that, based on the continuation of such preferences in a subsequent time interval, that an otherwise predicted preference should be skipped over for the particular group. For example, a drift in preferences from "Purple" to "Red" is illustrated between T0 and T2 for Group 4. Accordingly, the collaborative recommendation model may ordinarily predict that Group 2 should similarly transition from "Purple" to "Red" at T3. However, because this does not occur in this example, the collaborative recommendation model may identify that "Red" should be skipped for Group 2, and that a subsequent transition should be from "Purple" to "Green" as illustrated at T4 (e.g., drift from "Red" to "Green" is illustrated throughout the matrix, so if "Red" is skipped, the drift may go straight from "Purple" to "Green"). Alternatively, the collaborative recommendation model may identify that the otherwise predicted drift may be accurate, but should simply be delayed to a further time interval (e.g., remain "Purple" for two time intervals, then shift to "Red").

If preferences do extend beyond a single time interval, the collaborative recommendation model may update to reflect this delayed drift. For example, once the delay in drift from "Purple" is detected between T2 and T4 for Group 2, a subsequent "Purple" time interval may be predicted for groups that currently prefer "Purple" (e.g., as shown at T4 for Group 1).

In some instances, new groups and/or content may be added to the collaborative recommendation model. For example, as illustrated, a Group 5 may develop. With regard to new content, an option of "Yellow" may be introduced, for example (which may e.g., represent a new type of financial product, investment, or other content/product). In these instances, the collaborative recommendation model may undergo an initial training phase to identify the most effective (e.g., in terms of increasing the likelihood of a recommendation being accepted by a user) method/timing for recommending such new content.

In some instances, the time intervals used to identify or otherwise represent the preference/data drift might not be uniform or a consistent size. For example, the time between T0 and T1 may be one week, whereas the time between T1 and T2 may be one month. Specifically, these time intervals may be defined as a time duration between initial preferences or a preference shift, and a shift in preferences of a percentage of users in a particular group that exceeds a threshold (e.g., preferences of more than 50% of the group members have changed). In these instances, once the preference shift has been detected for a particular group, preference drift may be predicted and established for the remaining groups. In other instances, however, the time intervals may be a consistent size, and predictions may be made for one or more groups at regular intervals. In some instances, these time intervals may be tied to other factors such as seasons, weather, holidays, vacations, and/or other factors, which may lead to varied predictions based on changes of such factors.

At step 221, the recommendation platform 102 may generate an updated recommendation output (e.g., updated recommendation information) based on the identified preference group and data drift pattern. As an illustrative example (and continuing with the description of FIG. 6), the recommendation platform 102 may generate an output recommending "Purple" to the user device 104.

At step 222, the recommendation platform 102 may send the updated recommendation output to the user device 104. For example, the recommendation platform 102 may send the updated recommendation output to the user device 104 via the communication interface 113 and while the second wireless data connection is established. In some instances, the recommendation platform 102 may also send one or more commands directing the user device 104 to display the updated recommendation output.

At step 223, the user device 104 may receive the updated recommendation output sent at step 222. For example, the user device 104 may receive the updated recommendation output while the second wireless data connection is established. In some instances, the user device 104 may also receive one or more commands directing the user device 104 to display the updated recommendation output.

At step 224, based on or in response to the one or more commands directing the user device 104 to display the updated recommendation output, the user device 104 may display the updated recommendation output. For example, the user device 104 may display a graphical user interface similar to graphical user interface 505, which is displayed in FIG. 5, and which may indicate an updated content/product recommendation based on shifting preferences of the user.

Figure 2F:
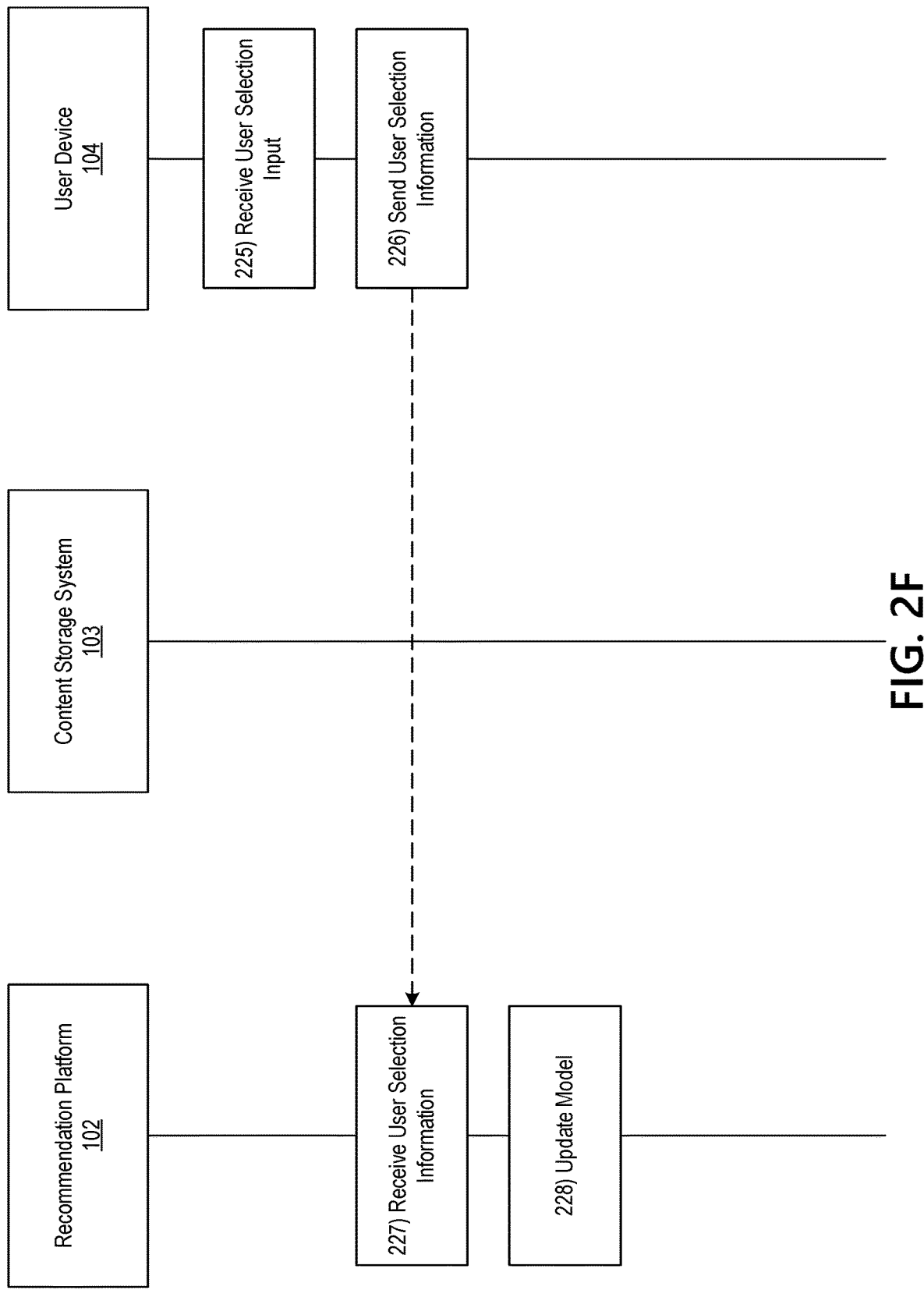

Referring to FIG. 2F, at step 225, the user device 104 may receive a second user selection input. For example, the user device 104 may receive a user input indicating whether or not to enroll the user in and/or otherwise display the newly recommended content.

At step 226, the user device 104 may send second user selection information, based on the second user selection input, to the recommendation platform 102. For example, the user device 104 may send the second user selection information to the recommendation platform 102 while the second wireless data connection is established.

At step 227, the recommendation platform 102 may receive the second user selection information sent at step 216. For example, the recommendation platform 102 may receive the user selection information via the communication interface 113 and while the second wireless data connection is established.

At step 228, the recommendation platform 102 may update the collaborative recommendation model based on the second user selection information. For example, the recommendation platform 102 may perform similar actions as those described above at step 218 with regard to updating based on the user selection information.

Steps 201-228 may be applied in the recommendation of any content, products, and/or other items without departing from the scope of this disclosure. For example, the recommendations may be applied to music, television, movies, financial products (e.g., loan products, credit cards, financial incentives, investment products, or the like), and/or other products/content.

Figure 3:
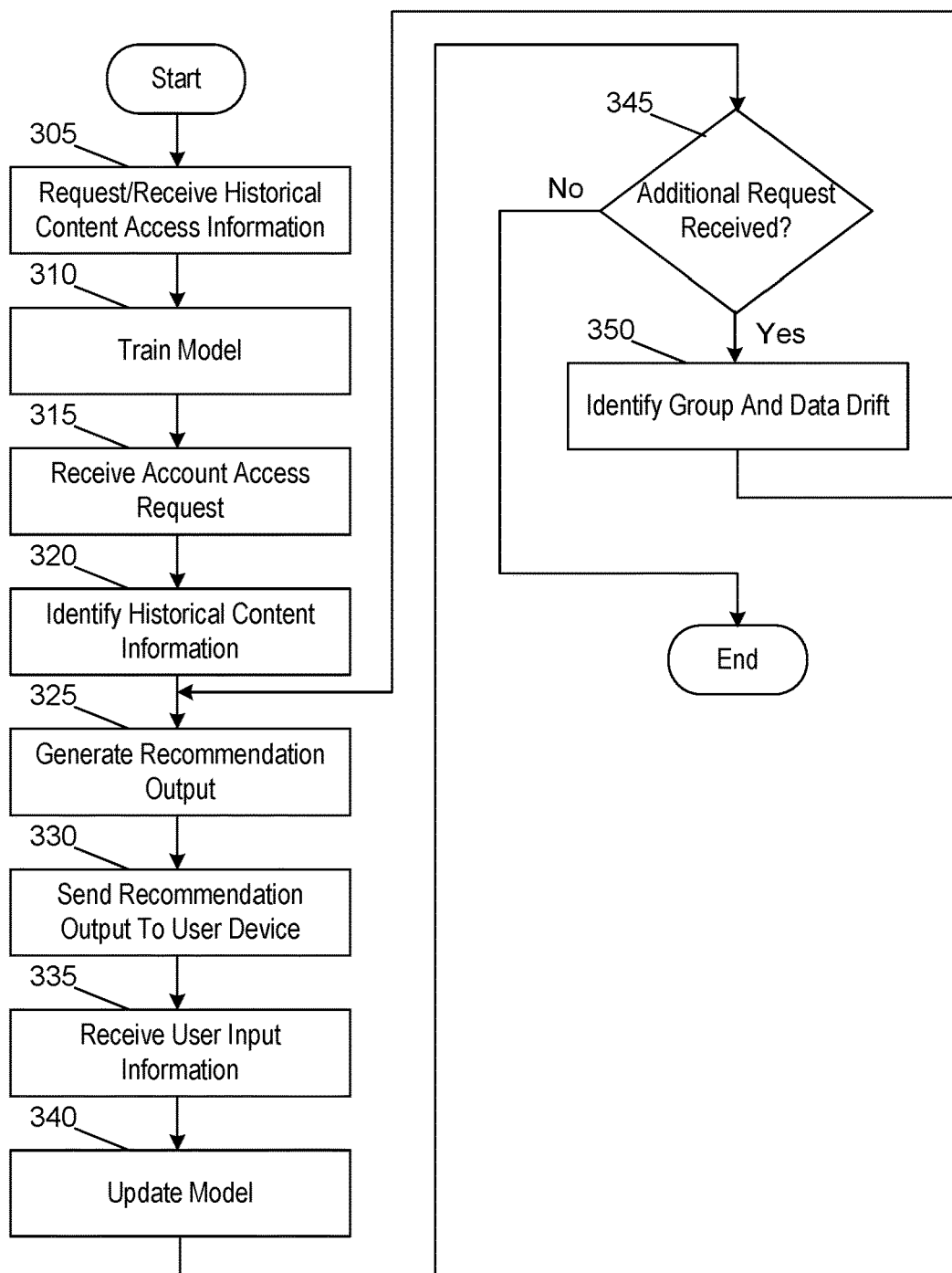
FIG. 3 depicts an illustrative method for correcting taste and/or preference drifts in recommendation systems in accordance with one or more example embodiments.

FIG. 3 depicts an illustrative method for correcting taste and/or preference drifts in recommendation systems in accordance with one or more example embodiments. Referring to FIG. 3, at step 305, a computing platform having at least one processor, a communication interface, and memory may request and receive historical content access information. At step 310, the computing platform may train a collaborative recommendation model using the historical content access information. At step 315, the computing platform may receive an account access request from a user device. At step 320, the computing platform may identify historical content information and a preference group for the user device. At step 325, the computing platform may generate a recommendation output for the user device. At step 330, the computing platform may send the recommendation output to the user device. At step 335, the computing platform may receive user input information. At step 340, the computing platform may update the collaborative recommendation model based on the user input information. At step 345, the computing platform may identify whether or not an additional account access request is received. If not, the method may end. If so, the computing platform may proceed to step 350, and may identify the preference group and corresponding data drift. The computing platform may then return to step 325.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using historical preference information, a collaborative recommendation engine, wherein training the collaborative recommendation engine configures the collaborative recommendation engine to output recommendation information based on:
     historical user preference information of various user groups, and
     data drift of the historical preference information for each of the various user groups;
   receive an account access request from a user device;
   identify, at a first time and using the collaborative recommendation engine, a preference group for the user device, wherein identifying the preference group is based on a similarity of preferences between the preference group and a user of the user device, and wherein the preference group corresponds to a first set of preferences at the first time;
   provide, to the user device and based on the first set of preferences, first recommendation information;
   receive, at a second time later than the first time, a second account access request from the user device;
   identify, using the collaborative recommendation engine, the preference group and data drift corresponding to the preference group between the first time and the second time, wherein the data drift indicates that the preference group corresponds to a second set of preferences at the second time, and wherein identifying the data drift comprises:
   identifying a different preference group that previously corresponded to the first set of preferences;
   identifying that the different preference group transitioned from the first set of preferences to the second set of preferences; and
   automatically predicting, based on the transition of the different preference group from the first set of preferences to the second set of preferences, the data drift indicating that the preference group corresponds to the second set of preferences at the second time;
automatically generate, based on the second set of preferences, second recommendation information for the user device; and
send, to the user device, the second recommendation information and one or more commands directing the user device to display the second recommendation information, wherein sending the one or more commands to the user device causes the user device to display the second recommendation information.

2. The computing platform of claim 1, wherein the memory stores additional computer-readable instructions that, when executed by the at least one processor, cause the computing platform to:
   provide, before training the collaborative recommendation engine, using a content-based recommendation engine, and to a plurality of user devices, initial recommendation information.

3. The computing platform of claim 2, wherein the memory stores additional computer-readable instructions that, when executed by the at least one processor, cause the computing platform to:
   receive, from each of the plurality of user devices, user preference information; and
   generate, based on the user preference information, one or more preference groups, each including a subset of the plurality of user devices, wherein each of the one or more preference groups is characterized by the user preference information of the corresponding subset of the plurality of user devices, and wherein the one or more preference groups include the preference group.

4. The computing platform of claim 3, wherein the memory stores additional computer-readable instructions that, when executed by the at least one processor, cause the computing platform to:
   store, for each of the one or more preference groups, a correlation between the corresponding preference group and recommended content for the given preference group at an initial time, prior to the first time.

5. The computing platform of claim 4, wherein the memory stores additional computer-readable instructions that, when executed by the at least one processor, cause the computing platform to:
   identify, by comparing, for each preference group, preferences at the initial time and the first time, the data drift, wherein the data drift indicates a shift in preferences and comprises a temporal relationship between preferences at the initial time and the first time.

6. The computing platform of claim 5, wherein identifying, using the collaborative recommendation engine, the preference group and data drift corresponding to the preference group between the first time and the second time, comprises predicting, based on the data drift between the initial time and the second time, the second set of preferences for the user device.

7. The computing platform of claim 1, wherein the data drift indicates that one or more preference groups have merged.

8. The computing platform of claim 1, wherein the data drift indicates that one or more preference groups have split.

9. The computing platform of claim 1, wherein the memory stores additional computer-readable instructions that, when executed by the at least one processor, cause the computing platform to:
   update, based on the data drift, the collaborative recommendation engine.

10. The computing platform of claim 1, wherein the memory stores additional computer-readable instructions that, when executed by the at least one processor, cause the computing platform to:
   use data drift for a first user preference group to predict future preferences for a second preference group, different than the first preference group.

11. A method comprising
at a computing platform comprising at least one processor, a communication interface, and memory:
   training, using historical preference information, a collaborative recommendation engine, wherein training the collaborative recommendation engine configures the collaborative recommendation engine to output recommendation information based on:
      historical user preference information of various user groups, and
      data drift of the historical preference information for each of the various user groups;
   receiving an account access request from a user device;
   identifying, at a first time and using the collaborative recommendation engine, a preference group for the user device, wherein identifying the preference group is based on a similarity of preferences between the preference group and a user of the user device, and wherein the preference group corresponds to a first set of preferences at the first time;
   providing, to the user device and based on the first set of preferences, first recommendation information;
   receiving, at a second time later than the first time, a second account access request from the user device;
   identifying, using the collaborative recommendation engine, the preference group and data drift corresponding to the preference group between the first time and the second time, wherein the data drift indicates that the preference group corresponds to a second set of preferences at the second time, and wherein identifying the data drift comprises:
      identifying a different preference group that previously corresponded to the first set of preferences;
      identifying that the different preference group transitioned from the first set of preferences to the second set of preferences; and
      automatically predicting, based on the transition of the different preference group from the first set of preferences to the second set of preferences, the data drift indicating that the preference group corresponds to the second set of preferences at the second time;
   automatically generating, based on the second set of preferences, second recommendation information for the user device; and sending, to the user device, the second recommendation information and one or more commands directing the user device to display the second recommendation information, wherein sending the one or more commands to the user device causes the user device to display the second recommendation information.

12. The method of claim 11, further comprising:
providing, before training the collaborative recommendation engine, using a content-based recommendation engine, and to a plurality of user devices, initial recommendation information.

13. The method of claim 12, further comprising:
receiving, from each of the plurality of user devices, user preference information; and
generating, based on the user preference information, one or more preference groups, each including a subset of the plurality of user devices, wherein each of the one or more preference groups is characterized by the user preference information of the corresponding subset of the plurality of user devices, and wherein the one or more preference groups include the preference group.

14. The method of claim 13, further comprising:
storing, for each of the one or more preference groups, a correlation between the corresponding preference group and recommended content for the given preference group at an initial time, prior to the first time.

15. The method of claim 14, further comprising:
identifying, by comparing, for each preference group, preferences at the initial time and the first time, the data drift, wherein the data drift indicates a shift in preferences and comprises a temporal relationship between preferences at the initial time and the first time.

16. The method of claim 15, wherein identifying, using the collaborative recommendation engine, the preference group and data drift corresponding to the preference group between the first time and the second time, comprises predicting, based on the data drift between the initial time and the second time, the second set of preferences for the user device.

17. The method of claim 11, wherein the data drift indicates that one or more preference groups have merged.

18. The method of claim 11, wherein the data drift indicates that one or more preference groups have split.

19. The method of claim 11, further comprising:
updating, based on the data drift, the collaborative recommendation engine.

20. One or more non-transitory computer-readable media storing instructions that, when executed by a computing platform comprising at least one processor, a communication interface, and memory, cause the computing platform to:

train, using historical preference information, a collaborative recommendation engine, wherein training the collaborative recommendation engine configures the collaborative recommendation engine to output recommendation information based on:
  historical user preference information of various user groups, and
  data drift of the historical preference information for each of the various user groups;
receive, at a first time, an account access request from a user device;
identify, using the collaborative recommendation engine, a preference group for the user device, wherein identifying the preference group is based on a similarity of preferences between the preference group and a user of the user device, and wherein the preference group corresponds to a first set of preferences at the first time;
provide, to the user device and based on the first set of preferences, first recommendation information;
receive, at a second time later than the first time, a second account access request from the user device;
identify, using the collaborative recommendation engine, the preference group and data drift corresponding to the preference group between the first time and the second time, wherein the data drift indicates that the preference group corresponds to a second set of preferences at the second time, and wherein identifying the data drift comprises:
  identifying a different preference group that previously corresponded to the first set of preferences;
  identifying that the different preference group transitioned from the first set of preferences to the second set of preferences; and
  automatically predicting, based on the transition of the different preference group from the first set of preferences to the second set of preferences, the data drift indicating that the preference group corresponds to the second set of preferences at the second time;
automatically generate, based on the second set of preferences, second recommendation information for the user device; and
send, to the user device, the second recommendation information and one or more commands directing the user device to display the second recommendation information, wherein sending the one or more commands to the user device causes the user device to display the second recommendation information.

* * * * *